United States Patent
Ko et al.

(10) Patent No.: US 6,873,083 B2
(45) Date of Patent: Mar. 29, 2005

(54) DOUBLE BRUSH ASSEMBLY

(75) Inventors: Fretrick Siu Kwan Ko, Hong Kong (CN); Yiu Leung Man, Hong Kong (CN)

(73) Assignee: Johnson Electric S.A., La Chaux-de-Fonds (CH)

( * ) Notice: Subject to any disclaimer, the term of this patent is extended or adjusted under 35 U.S.C. 154(b) by 8 days.

(21) Appl. No.: 10/442,279

(22) Filed: May 21, 2003

(65) Prior Publication Data

US 2004/0183394 A1 Sep. 23, 2004

(30) Foreign Application Priority Data

May 21, 2002 (GB) ................................................ 0211604

(51) Int. Cl.[7] .......................... H02K 39/38; H02K 39/42
(52) U.S. Cl. ...................... 310/233; 310/239; 310/240; 310/245; 310/248
(58) Field of Search ................................ 310/239, 248, 310/245, 233, 232, 235, 238, 237, 240, 242; 29/596–598

(56) References Cited

U.S. PATENT DOCUMENTS

| 2,775,717 A | 12/1956 | Laing | ........................ 310/246 |
|---|---|---|---|
| 4,539,500 A | 9/1985 | Houben et al. | ............. 310/230 |
| 4,663,552 A | 5/1987 | Ohmstedt | |
| 5,280,210 A | 1/1994 | Kress et al. | ................. 310/158 |
| 5,753,995 A | * 5/1998 | Ogino | .......................... 310/242 |
| 6,411,004 B1 | * 6/2002 | Liau | ............................. 310/158 |

FOREIGN PATENT DOCUMENTS

| DE | 1 055 674 B | 4/1959 | |
|---|---|---|---|
| DE | 42 03 070 A1 | 8/1993 | |
| GB | 2 244 603 A | 4/1991 | |
| JP | 08298753 A | * 11/1996 | .......... H02K/13/00 |
| JP | 08-298753 A | 3/1997 | |
| JP | 9-140100 A | 4/1997 | |

* cited by examiner

*Primary Examiner*—Darren Schuberg
*Assistant Examiner*—Leda Pham
(74) *Attorney, Agent, or Firm*—Birch, Stewart, Kolasch & Birch, LLP.

(57) ABSTRACT

A multi-brush cage assembly for a subfractional horsepower electric motor has two brushes 22, 23 received in separate chambers 24, 25 of the cage and urged by springs 26, 27 towards a commutator 15 of the motor. An L-shaped changeover lever 30 is located on a pivot 33 between the chambers and keeps one brush 23 retracted until the other brush 22 has worn out.

11 Claims, 2 Drawing Sheets

DOUBLE BRUSH ASSEMBLY

This invention relates to subfractional horsepower electric motors of the universal type and in particular, to a cage brush assembly for such motors.

Universal motors have many uses and are commonly used in household appliances. One drawback of using universal motors is that they have a wound rotor and use brushes rubbing on a commutator to transfer electrical energy to the rotor windings. This introduces a life limitation. The higher the power of the motor, the higher the current drawn and the faster the brushes wear. For many small electric motors, the cost of replacing the brushes is prohibitive and most appliances come to the end of their useful life when the motor wears out. However, many appliance manufacturers would like to guarantee their appliances to run for so many hours and this has become an important marketing advantage. As other parts of the motor have improved, the life limiting factor has become the life of the brushes. While the life can be increased by brush composition and the power of the motor, there are other factors which must be taken into account in these choices and as so often is the case, compromises have to be made. However, there is still a need for a longer life motor.

Another option is to make the brushes longer. However, in many applications, the brushes are already as long as practical or there simply is not the room in the appliance to allow for longer brushes to be used.

Thus, the desire to provide longer life from the brush assembly has gone unfulfilled until now.

SUMMARY OF THE INVENTION

The present invention fulfills this desire by providing a double brush assembly in which, when a first brush reaches its wear limit, a second brush is brought into operation thereby extending the life of the brush assembly.

Accordingly, in one aspect thereof, the present invention provides a brush assembly for subfractional horsepower electric motor, comprising: first and second brushes; guide means for guiding the brushes; first and second springs for respectively urging the brushes in one direction under the guidance of the guide means from a first position towards a second position, and a changeover mechanism for switching operation from the first brush to the second brush when the first brush reaches the second position, wherein the changeover mechanism includes a lever pivotably mounted on a pin located between the brushes whereby the second brush is held in the first position against the urgings of the second spring until the first brush reaches the second position.

Preferably, the guide means comprises a brush cage having two compartments in which the brushes are slidably received under the urgings of the springs and the pin is mounted in the cage and extends transversely of the cage between the compartments.

Preferably, the first brush has a recess near a non-contact end in a side facing the lever, said recess being arranged to receive one arm of the lever when the first brush is in the second position, to allow the lever to pivot and release the second brush.

Preferably, the lever upon releasing the second brush retracts the first brush from the second position.

Preferably, the lever is L-shaped with a first arm arranged to retract the first brush when the first brush reaches the second position and a second arm arranged to release the second brush when the first brush is retracted.

In a second aspect, the invention also provides a subfractional horsepower universal motor incorporating two brush assemblies as described above.

By use of the inventive brush assembly, the life of the motor can be extended with the expectant brush life increased up to double the previous life without increasing the radial width of the motor, although the axial length of the motor may need to be increased slightly to accommodate the extra brush. If longer brush life is required, the brush assembly can be adapted to receive any number of additional brushes.

BRIEF DESCRIPTION OF THE DRAWINGS

A preferred embodiment of the invention will now be described, by way of example only, with reference to the accompanying drawings, in which.

DETAILED DESCRIPTION OF THE PREFERRED EMBODIMENT

Figure 1:
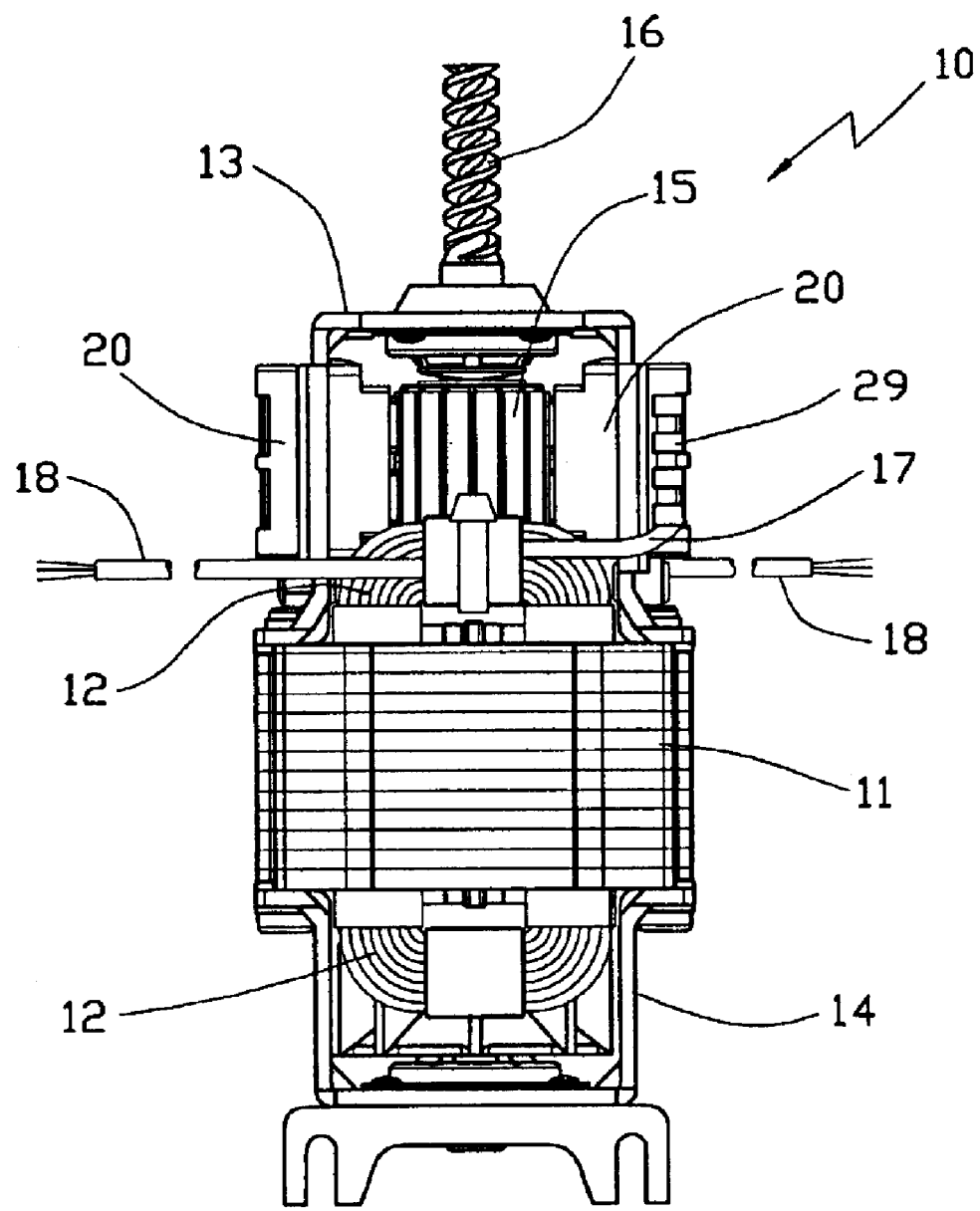
FIG. 1 illustrates a universal motor incorporating a brush assembly according to the preferred embodiment.

FIG. 1 illustrates a universal motor 10 which apart from the brush gear is of conventional construction. As such, it has a wound stator core 11 supporting stator windings 12 and end brackets 13, 14 which hold bearings. A wound rotor having a rotor core, rotor windings and a commutator 15 mounted on a shaft 16. The shaft 16 is journalled in the bearings. One end bracket 13 also supports the brush gear which comprises two brush assemblies 20. A lead 17 connects the stator windings to the brush assemblies and power leads 18 connect the stator windings to the electric supply.

Figure 2:
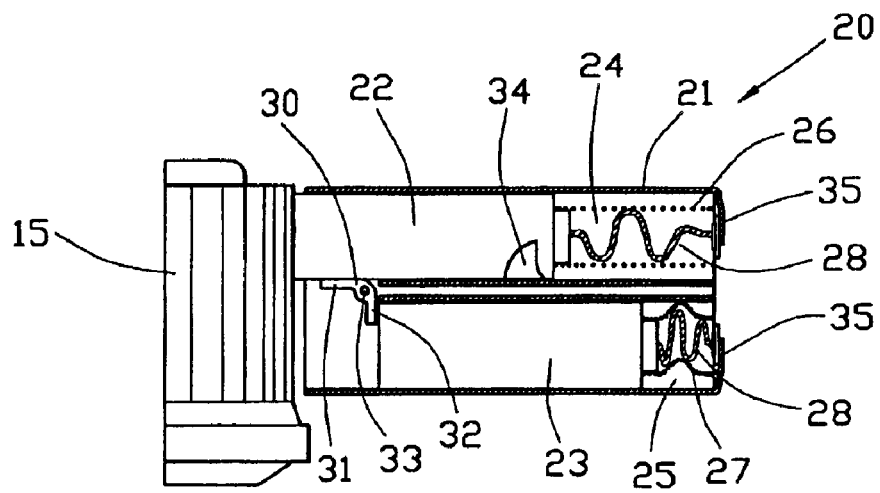
FIG. 2 is a schematic illustration of the brush assembly.
Figure 3:
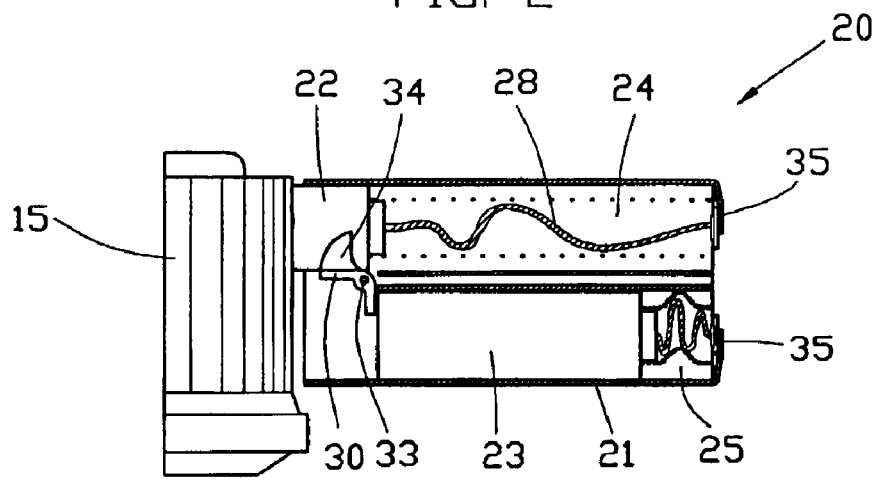
FIG. 3 is a schematic illustration similar to FIG. 2 at the moment of change over.
Figure 4:
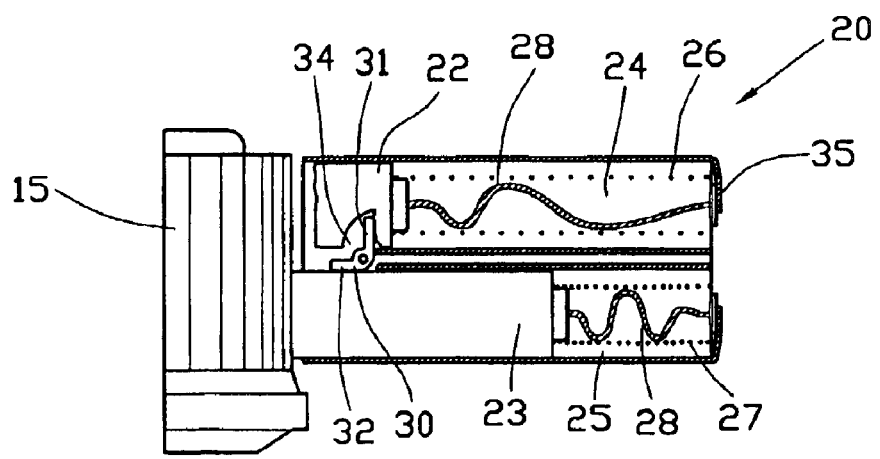
FIG. 4 is a schematic illustration similar to FIG. 2 just after the change over.

As the brush assemblies are identical, only one will be described. FIGS. 2–4 schematically illustrate the construction and operation of a brush assembly.

The brush assembly 20 has a cage 21 which guides first and second carbon brushes 22, 23 into contact with the commutator 15. Each brush 22, 23 is slidably received in a separate compartment 24, 25 and urged into contact with the commutator 15 by a spring 26, 27. Shunts 28 electrically connect the brushes to the cage and to terminals 29 (FIG. 1). An L-shaped changeover lever 30 has a first arm 31 and a second arm 22 and is located between the brush compartments 24, 25 at the commutator end of the cage 21. The changeover lever 30 is pivotably mounted on a pin 33 and is able to pivot between an initial position shown in FIG. 3 to a release position shown in FIG. 4. Brush 22, which is to be used first, has a cutout portion 34 in the side facing the changeover lever 30 at the shunt end. The purpose of the cutout portion 34 will be described hereinafter.

During assembly, the first brush 22 is slid into its compartment 24, the spring 26 is compressed on top of the brush 22, the shunt 28 is connected to the cage 21 and a flap 35 or two at the end of the compartment 24 is bent over to retain the spring 26. Brush 22 pushes the first arm 31 of the changeover lever 30 out of compartment 24 by pivoting the lever about the pin 33. The first arm 31 of the lever 30 is now laying alongside the first brush 22 while the second arm is projecting across the second compartment 25. The second brush 23 is now slid into compartment 25 but is prevented from reaching the commutator 15 by the changeover lever

30. A second spring 27 is pressed on top of brush 23, the shunt 28 is connected and one or two flaps 35 are bent to retain the spring 27 within compartment 25. The assembly is shown in FIG. 2.

As the motor is used, the first brush 22 is worn away until, approaching end of useful life, the situation shown in FIG. 3 is reached. At this point, the cutout portion 34 in brush 22 is aligned with the first arm 31 of the changeover lever 30 allowing the lever 30 to pivot clockwise releasing the second brush 23 which has been held up by arm 32.

As the second brush 23, under urgings of spring 27, pivots the lever 30 clockwise in its rush toward the commutator 15, it causes the lever 30 to retract the first brush 22 from the commutator 15 slightly, preventing it from wearing further on the commutator and reduces sparking. This occurs by the first arm 31 contacting the upper surface of the cutout portion 34 before arm 31 has reached end of travel when it extends perpendicularly across the compartment 24. Arm 32 is now parallel to the brush direction and the lever 30 is prevented from pivoting anticlockwise to release the first brush 22 by the second brush 23 which is now blocking the return of the second arm 32, as shown in FIG. 4.

The cutout portion 34 may be any convenient shape but the shape shown, namely a quarter circle cutout with a rounded upper outer corner has an advantage of minimal material removal to keep the increase in brush resistance and loss of mechanical strength to a minimum. The rounded upper outer corner facilitates the retraction of the brush and allows the lever to start pivoting with little resistance from the first brush 22, allowing the arm 31 to gently roll along the upper surface of the cutout 34 as it retracts the brush 22.

The embodiment described above is given by way of example only and various modifications will be apparent to persons skilled in the art without departing from the scope of the invention as defined in the appended claims.

What is claimed is:

1. A brush assembly for subfractional horsepower electric motor, comprising:
   first and second brushes;
   guide means for guiding the brushes;
   first and second springs for respectively urging the brushes in one direction under the guidance of the guide means from a first position towards a second position, and
   a changeover mechanism for switching operation from the first brush to the second brush when the first brush reaches the second position, the changeover mechanism including a lever pivotally mounted on a pin located between the brushes so that the second brush is held in the first position against the urgings of the second spring until the first brush reaches the second position.

2. The brush assembly of claim 1, wherein the guide means comprises a brush cage having two compartments in which the brushes are slidably received under the urgings of the springs and the pin is mounted in the cage and extends transversely of the cage between the compartments.

3. The brush assembly of claim 1, wherein the first brush has a recess near a non-contact end in a side facing the lever, said recess being arranged to receive one arm of the lever when the first brush is in the second position, to allow the lever to pivot and release the second brush.

4. The brush assembly of claim 1, wherein the lever upon releasing the second brush retracts the first brush from the second position.

5. The brush assembly of claim 1, wherein each brush has a shunt electrically connecting the brush to the guide means.

6. The brush assembly of claim 1 wherein the lever is L-shaped with a first arm arranged to retract the first brush when the first brush reaches the second position and a second arm arranged to release the second brush when the first brush is retracted.

7. A subfractional horsepower universal motor, comprising:
   a wound stator;
   a wound rotor including a commutator; and
   brush gear including two brush assemblies, each brush assembly comprising:
   first and second brushes;
   guide means for guiding the brushes into sliding contact with the commutator;
   first and second springs for respectively urging the first and second brushes towards the commutator under the guidance of the guide means, and
   a changeover mechanism for switching operation from the first brush to the second brush when the first brush has worn a predetermined amount, the changeover mechanism including a lever pivotally mounted on a pin located between the brushes and pivotable between a first position in which the lever holds the second brush in a retracted position against the urgings of the second spring and a second position in which the second brush is released, when the first brush has worn said predetermined amount.

8. The motor of claim 7, wherein the guide means comprises a brush cage having two compartments in which the brushes are slidably received under the urgings of the springs and the pin is mounted in the cage and extends transversely of the cage between the compartments.

9. The motor of claim 7, wherein the first brush has a recess near an end remote from the commutator, in a side facing the lever, the recess being arranged to receive one arm of the lever, when the first brush has worn said predetermined amount, to allow the lever to pivot and release the second brush.

10. The motor of claim 7, wherein the lever, in the second position, retracts the first brush from contact with the commutator.

11. The motor of claim 7, wherein the lever is L-shaped with a first arm arranged to retract the first brush when the first brush reaches the second position and a second arm arranged to release the second brush when the first brush is retracted.

* * * * *